Figure 1:
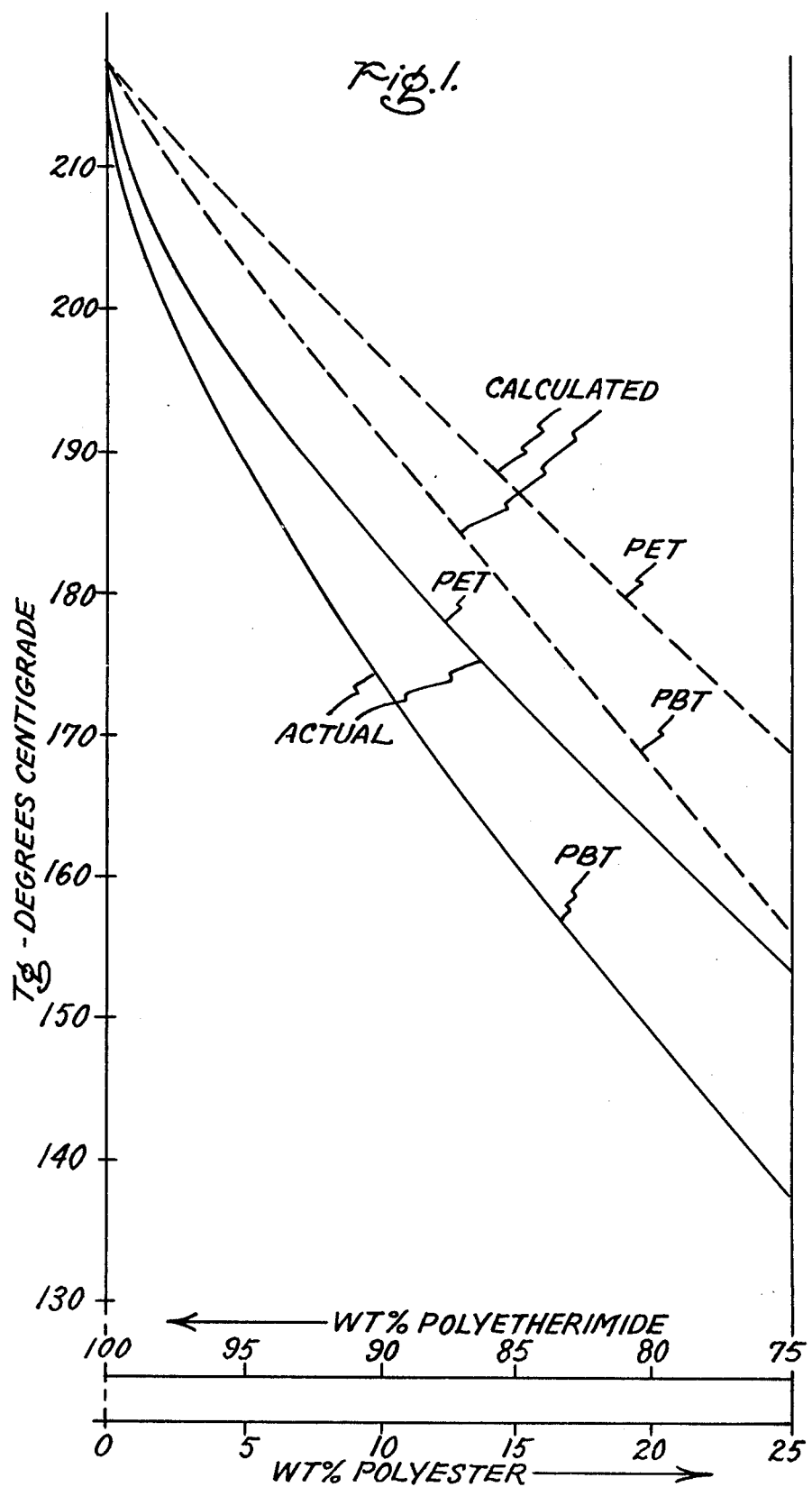

United States Patent [19]

White et al.

[11] 4,141,927
[45] Feb. 27, 1979

[54] NOVEL POLYETHERIMIDE-POLYESTER BLENDS

[75] Inventors: Dwain M. White; Robert O. Matthews, both of Schenectady, N.Y.

[73] Assignee: General Electric Company, Schenectady, N.Y.

[21] Appl. No.: 580,061

[22] Filed: May 22, 1975

[51] Int. Cl.² ............................................. C08L 79/08
[52] U.S. Cl. ........................ 260/857 PA; 260/857 PE
[58] Field of Search ............. 260/860, 47 CZ, 78 TF, 260/857 PA, 857 PE

[56] References Cited

U.S. PATENT DOCUMENTS

| | | | |
|---|---|---|---|
| 3,048,564 | 8/1962 | Heffelfinger | 260/75 R |
| 3,057,826 | 10/1962 | Griffing | 260/75 R |
| 3,622,525 | 11/1971 | Miller | 260/860 |
| 3,838,097 | 9/1974 | Wirth | 260/47 CZ |
| 3,847,869 | 11/1974 | Williams | 260/47 CZ |
| 3,850,885 | 11/1974 | Takekoshi | 260/47 CZ |
| 3,855,178 | 12/1974 | White | 260/47 CZ |

*Primary Examiner*—Paul R. Michl
*Attorney, Agent, or Firm*—F. Wesley Turner; Joseph T. Cohen; Charles T. Watts

[57] ABSTRACT

This invention is concerned with a new class of polyetherimide-polyester blends. More particularly, the invention is concerned with polyetherimide-polyester blends which exhibit melt viscosities lower than those associated with the polyetherimide component of the blends. The polyetherimide-polyester blends are suitable for the manufacture of filaments, fibers, films, molding compounds, coatings, etc.

12 Claims, 2 Drawing Figures

NOVEL POLYETHERIMIDE-POLYESTER BLENDS

This invention is concerned with a new class of polyetherimide-polyester blends. These polyetherimide-polyester blends exhibit melt viscosities lower than those associated with the polyetherimide component of the blends.

The novel polyetherimide-polyester blends comprise:
(A) a polyetherimide of the formula

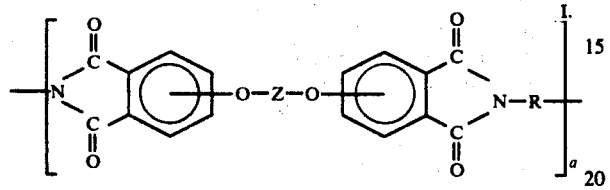

where a represents a whole number in excess of 1, e.g., 10 to 10,000 or more, —O—Z—O— is in the 3 or 4- and 3' or 4'-positions, and Z is a member of the class consisting of (1)

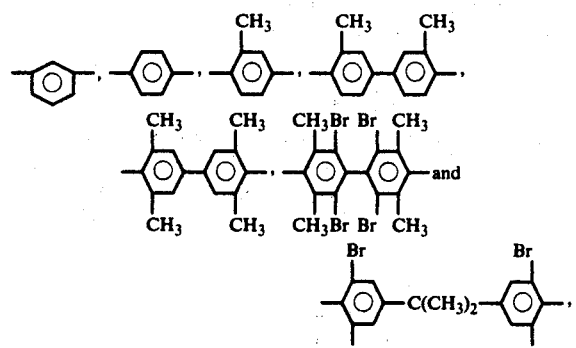

and (2) divalent organic radicals of the general formula:

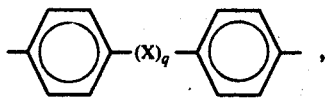

where X is a member selected from the class consisting of divalent radicals of the formulas,

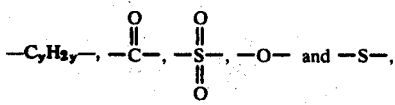

where q is 0 or 1, y is a whole number from 1 to 5, the divalent bonds of the —O—Z—O— radical being situated on the phthalic anhydride end groups, e.g., in the 3,3'-3,4'-, 4,3'- or the 4,4'-positions, and R is a divalent organic radical selected from the class consisting of (a) aromatic hydrocarbon radicals having from 6–20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula

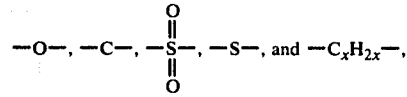

where Q is a member selected from the class consisting of

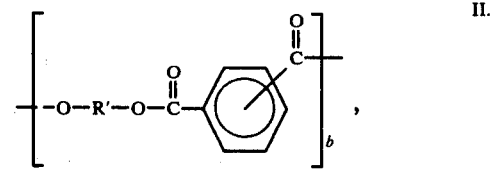

where x is a whole number from 1 to 5 inclusive, and (B) a polyester of the formula

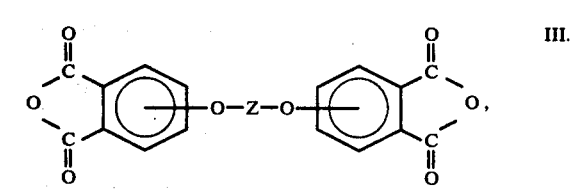

where b represents a whole number in excess of 1, e.g., 10 to 10,000 or more, R' is a divalent alkylene radical containing from 1 to 10 or more carbon atoms, and the two carbonyl groups are located on the aromatic ring in a para- or meta-position relative to each other.

The polyetherimides of Formula I can be obtained by any of the methods well-known to those skilled in the art including the reaction of any aromatic bis(ether anhydride)s of the formula

where Z is as defined hereinbefore with a diamino compound of the formula

IV. $H_2N$-R-$NH_2$ where R is as defined hereinbefore. In general, the reactions can be advantageously carried out employing well-known solvents, e.g., o-dichlorobenzene, m-cresol/toluene, etc., in which to effect interaction between the dianhydrides and the diamines, at temperatures of from about 100 to about 250° C. Alternatively, the polyetherimides can be prepared by melt polymerization of any dianhydride of Formula III with any diamino compound of Formula IV while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally useful polyetherimides (hereinafter sometimes referred to as PEI) of Formula I have an intrinsic viscosity [$\eta$] greater than 0.2 deciliters per gram, preferably 0.35 to 0.60, or 0.7 deciliters per gram or even higher when measured in m-cresol at 25° C.

Included among the many methods of making the polyetherimides of Formula I are those disclosed in U.S. Pat. Nos. Heath et al. 3,847,867, Williams 3,847,869, Takekoshi et al. 3,850,885, White 3,852,242 and 3,855,178, etc. These disclosures are incorporated herein in their entirety by reference for the purpose of teaching, by way of illustration, general and specific methods for preparing polyetherimides suited to the practice of this invention.

The aromatic bis(ether anhydride)s of Formula III include, for example,
2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride; etc.
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)diphenyl-2,2-propane dianhydride; etc.
and mixtures of such dianhydrides.

In addition, aromatic bis(ether anhydride)s also included by Formula III are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin, 4(5), 774 (1968).

The organic diamines of Formula IV include, for example,
m-phenylenediamine,
p-phenylenediamine,
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine,
2,4-bis($\beta$-amino-t-butyl)toluene,
bis(p-$\beta$-amino-t-butylphenyl)ether,
bis(p-$\beta$-methyl-o-aminopentyl)benzine,
1,3-diamino-4-isopropylbenzene,
1,2-bis(3-aminopropoxy)ethane,
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, etc., and mixtures of such diamines.

The polyesters of Formula II can be obtained by any of the methods well-known to those skilled in the art including the reaction of any aromatic dicarboxylic acid of the formula

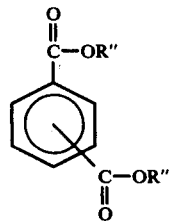

V.

where independently each R" is an alkyl radical having from 1–10 or more carbon atoms, with any aliphatic diol of the formula

VI. HO-R'-OH, where R' is as previously defined.

As used herein and in the appended claims, the term polyesters include esters of Formula II prepared by esterifying or transesterifying terephthalic acid, isophthalic acid, or their low molecular weight esters of Formula V, or mixtures thereof, plus other polyesters derived from aromatic dicarboxylic acids or their alkyl esters and other aliphatic diols or polyols other than those of Formulas V or VI, respectively, subject to the proviso that the Formula II polyesters contain at least about 95% by weight polyesters derived from the esterification or transesterification of dicarboxylic acid or esters of Formula V and aliphatic diols of Formula VI.

Preferred polyesters include polyethylene terephthalate and polybutylene terephthalate resins, hereafter sometimes referred to as PET and PBT, respectively. In general, the PET and PBT resins comprise high molecular weight poly(1,4-ethylene terephthalate) resins and poly(1,4-butylene terephthalate) resins having repeating units of the general formulas, respectively:

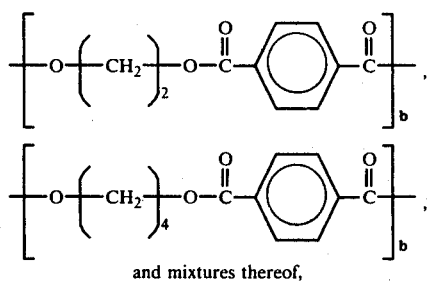

and mixtures thereof, b being as previously defined,

The preferred polyesters of this invention include PET copolyesters and PBT copolyesters, i.e., esters that contain a minor amount, e.g., from about 0.5 to about 2% by weight, of repeating units derived from an aliphatic or another aromatic dicarboxylic acid and/or another aliphatic diol and polyol. Among the units which can be present in the copolyesters are those derived from aliphatic dicarboxylic acids, e.g., acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized such acids, and the like. Among the units in the copolyesters can also be minor amounts derived from aromatic dicarboxylic acids, e.g., acids having up to about 36 carbon atoms, such as isophthalic acid and the like. In addition to the PET and PBT units derived from ethylene glycol and 1,4-butylene glycol, respectively, there can also be minor amounts of units derived from other aliphatic glycols and polyols, e.g., di- and polyols having up to about 50 carbon atoms, including ethylene glycol, propylene glycol, butylene glycol, cyclohexanediol, and the like.

Generally useful high molecular weight PE resins have an intrinsic viscosity of at least 0.2 and preferably about 0.8 deciliters per gram (dl./g.) as measured in o-chlorophenol, a 60/40 phenol-tetrachloroethane mixture or similar solvent systems when measured at 25°–30° C. The upper intrinsic viscosity limit is not critical, however will generally be about 2.5 dl./g. Especially preferred PE resins will have an intrinsic viscosity within the range of from about 0.5 to about 1.3.

Among the many methods of making the polyesters of Formula II, which are hereby incorporated herein in their entirety by reference, are those disclosed in the Encyclopedia of Polymer Science and Technology, Vol. II, entitled "Polyesters", pages 62–128, published by Interscience Publishers (1969), as well as those disclosed in Wirth et al., U.S. Pat. Nos. 3,787,364 and 3,838,097, etc., and Winfield et al., U.S. Pat. No. 2,465,319, Pengilly, U.S. Pat. No. 3,047,539, etc.

Illustratively, the esterification reactions advantageously can be carried out in an inert atmosphere in the presence of known esterification or transesterification catalysts at nominal reaction temperatures with the simultaneous removal of water or alkanol as produced at elevated temperatures with subsequent further polycondensation at elevated temperatures under reduced pressure in the presence of known catalysts until polyesters of the desired viscosity are obtained.

The polyetherimides of Formula I and polyesters of Formula II are combinable with each other in all proportions. Consequently, compositions comprising from 1 to 99%, by weight, polyetherimide and from 99 to 1%, by weight, polyester are included within the scope of the invention. By controlling the proportions of polyetherimide and polyester formulations having predetermined properties which are improved over those of either a polyetherimide or a polyester alone are readily obtained. In general, blends of polyetherimides and polyesters have substantially reduced melt viscosity values wherein nominal amounts of polyesters are combined with polyetherimides, while still retaining substantially the physical and chemical polymer property profile associated with the polyetherimides of Formula I.

The following examples illustrate but do not limit for persons skilled in the art the polyetherimide-polyester blends of this invention.

Unless otherwise indicated in the Examples, the following general procedures were employed in the preparation of the polyetherimides-polyester blends (sometimes abbreviated PEI–PE blends). For purposes of brevity, only deviations from these procedures will be noted in the specific examples.

GENERAL PROCEDURES

I. Films of PEI – PE, e.g., solution mixed, blends were prepared by 1) dissolving 10% by weight of the selected PEI and PE compositions in 90% by weight of a suitable solvent, e.g., tetrachloroethane, phenoltetrachloroethane mixtures, etc., 2) precipitating the contained PEI–PE blends by the addition of methanol, 3) drying the resulting PEI–PE blends under vacuum at 80° C. prior to analysis, 4) redissolving the PEI–PE blends in a suitable solvent, e.g., chloroform, 5) casting the PEI–PE chloroform solutions on a glass plate, and 6) drying the castings until constant film weight resulted, under vacuum at 80° C., e.g., during a period of 1 to 3 days, to produce films of about 1 to 5 mils in thickness for test purposes. The PEI–PE blends were examined visually for uniformity and were tested according to the following procedures: glass transition ($T_g$), crystallization ($T_c$) and melting ($T_m$) by differential scanning calorimetry and weight loss of volatiles by thermogravimetric analysis. All films precipitated from solvents and/or solvent cast showed less than 0.1% volatiles which indicated that the films were essentially solvent free.

II. Films were prepared employing steps 1), 2) and 3) of General Procedure I. above. The resulting dried blends were compression molded (5-minute preheat, 2 minute at 5000 psi) at 270° C.

III. PE and PEI extruded pellets were mixed at 60 rpm in a Banbury mixing bowl of a Brabender mixer at 275° for 20–30 minutes under a nitrogen atmosphere. The melt, after removal, cooled to a solid blend.

The PEI of the polymer blends employed in the examples were characterized by dianhydride and diamino reactants and had an intrinsic viscosity $[\eta] = 0.45$ dl./gm. at 25° C. measured in $CHCl_3$, a glass-transition temperature, $T_g$ of 216° C., and a zero shear (0.025 $sec^{-1}$) melt viscosity $m\nu = 25-35 \times 10^5$ poise measured by mechanical spectrometry at 300° C.

The polyesters employed in the blends were commercially available materials, e.g., Goodyear polyethylene terephthalate (PET) resin, i.e., Goodyear ® VFR 3599, intrinsic viscosity $[\eta] = 0.985$ dl./g. at 30° measured in 60% phenol-40% tetrachloroethane; General Electric polybutylene terephthalate (PBT) resins, i.e., Valox ®

310, zero shear (0.025 sec$^{-1}$) melt viscosity=5913 poise by mechanical spectrometry measured at 300° C. and Eastman Chemical Company polybutylene terephthalate (PBT) resin, i.e., Eastman® 6 PRO, zero shear (0.025 sec$^{-1}$) melt viscosity=14,000 poise measured by mechanical spectrometry at 300° C.

EXAMPLE I

A series of PEI-PE blends were prepared in accordance with General Procedure II. comprising various proportions of a (1) polyetherimide resin, a (2) polyethylene terephthalate or a polybutylene terephthalate resin. Calculated and observed glass-transition ($T_g$) temperatures of the polymer blends having PEI:PE proportions within the range of from 99:1 to 75:25 were determined and are illustrated in FIG. 1 of the drawings. The calculated $T_g$ values were determined in accordance with the following equation described by T. G. Fox in Bulletin of American Physical Society 1, 123 (1956):

$$\frac{1}{T_g(\text{PEI-PE})} = (a)\frac{1}{T_g(\text{PEI})} + (1-a)\frac{1}{T_g(\text{PE})},$$

where a equals the weight fraction of PEI in the blend. The observed $T_g$ values were determined employing differential scanning procedure (DSC) techniques in accordance with the teachings set out in J. Chiu, Polymer Characterization by Thermal Methods of Analysis, New York, Marcel Dekker, Inc. (1974).

Unexpectedly, the calculated PEI-PE blend average glass-transition temperature ranges were greater than the experimentally determined PEI-PE blend average glass-transition temperature ranges.

Figure 2:
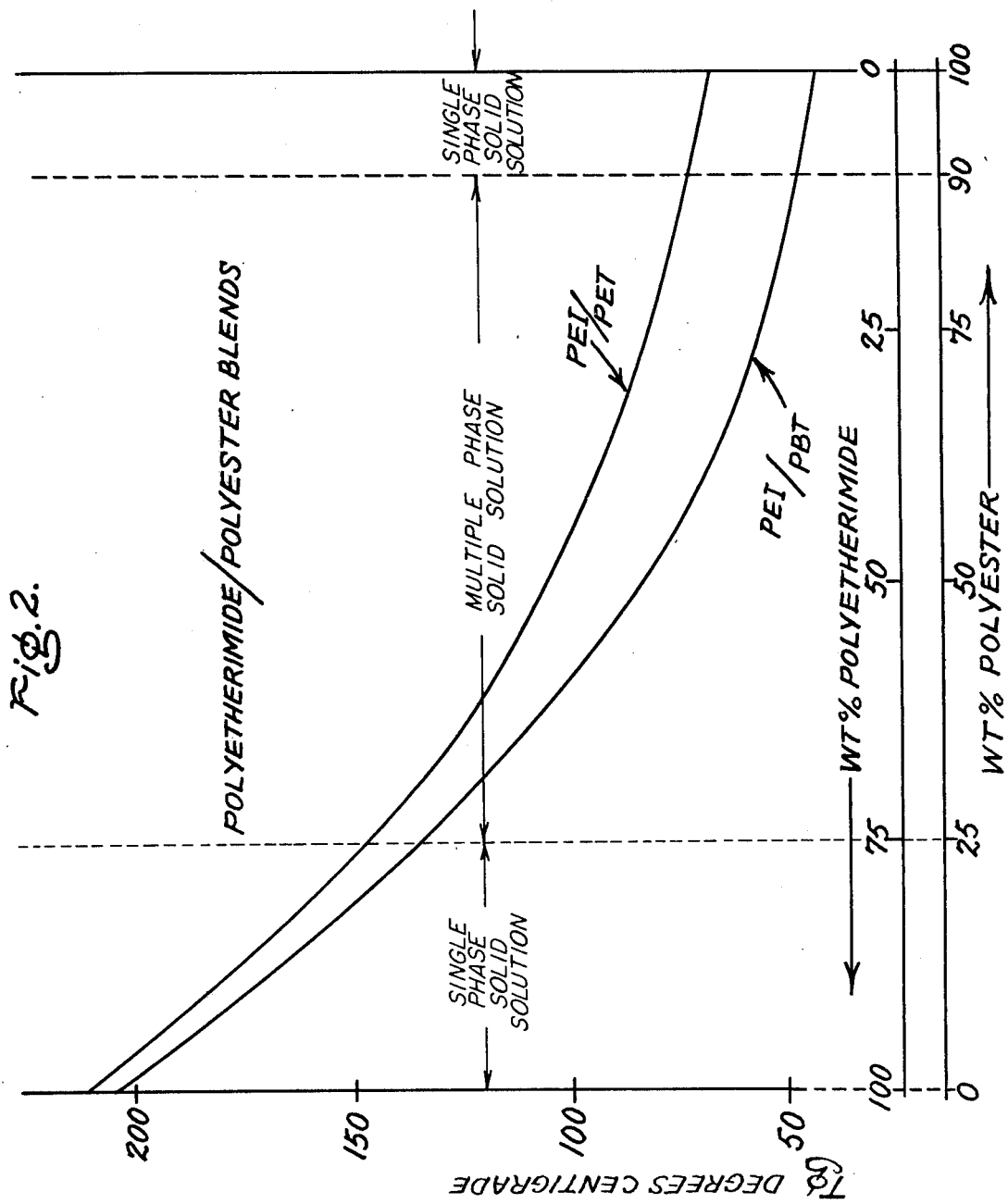

Further, as illustrated in FIG. 2 of the drawings, PEI-PE blends within the range of 99:1 to 75:25 and 10:90 to 1:99 exhibit a single phase solid solution having a single glass transition temperature not commonly found with PEI blends with other polymers such as polyethylene, polymethylmethacrylate, polyacrylonitrile, polyvinylacetate, polydimethylsiloxane, polypropylene, nylon 6—6, nylon 6-10, polystyrene, etc.

The polyetherimide of the PEI-PE blends were prepared by reacting 48.5 mole percent of the dianhydride, i.e., 2,2-bis[2,3-dicarboxy phenoxy)phenyl]propane dianhydride, of the formula

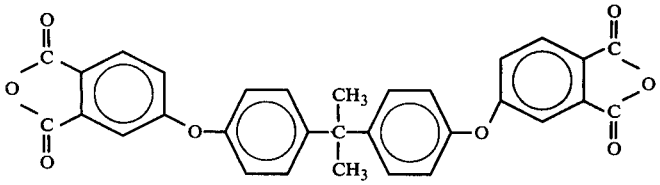

and 49.5 mole percent of meta-phenylene diamine at elevated temperatures, e.g., from about 250° to about 300° C. in the presence of a chain stopper, i.e., 2.0 mole percent of phthalic anhydride, in a Banbury mixing bowl under a nitrogen atmosphere. Water evolved during a time period of from about 20 minutes to about one hour and a viscous polyetherimide melt resulted. The polymer was extruded at 300° to form a strand which was mechanically chopped and injection molded into tensile test bars into small pellets. The resulting PEI had a tensile strength of 16,000 psi.

Substitution of other polyetherimides or mixtures thereof of Formula I and/or other polyesters including mixtures thereof of Formula II for the polyetherimide and/or polyester compounds of this example results in the formulation of other PEI-PE polymer blends having similar glass-transition temperature property profiles.

EXAMPLE II

A series of polyetherimide polyester blends were prepared in accordance with General Procedure II in order to determine the PEI-PBT property profiles defined by (1) glass-transition temperature ($T_g$) per DSC, (2) oxygen index (O.I.) per ASTM D2863, (3) tensile strength (T.S.) and elongation (E)% per ASTM D638, and (4) zero shear (0.025 sec$^{-1}$) melt viscosity (mν) measured by mechanical spectrometry at 300° C. Summarized in Table I hereafter are the proportions of PEI:PBT by weight correlated with the property profile data of the blends.

TABLE I

| | Polyetherimide/Polyester Blends | | | | | |
|---|---|---|---|---|---|---|
| Run No. | Blend | Weight Ratio | $T_g$ (°C.) | O.I. | T.S. (psi) | E (%) | mν (x 10$^{-5}$ poise) |
| 1. | PEI/PBT | 99/1 | 206 | 40 | 14,960 | 11 | 20 |
| 2. | PEI/PBT | 95/5 | 186 | 40 | 15,240 | 11 | 7.1 |
| 3. | PEI/PBT | 90/10 | 179 | 38 | 15,330 | 11 | 4.3 |
| 4. | PEI/PBT | 100/0 | 216 | 44–48 | 16,000 | 11–13 | 25–35 |

The ability of polyesters to effectively and significantly reduce the melt viscosity of polyetherimides without substantially changing the physical and chemical properties of polyetherimide is illustrated by the above data.

EXAMPLE III

A series of PEI-PET blends were prepared in accordance with the General Procedure II in order to determine the PEI-PET property profiles, i.e. glass transition temperature, oxygen index, tensile strength and elongation in accordance with the procedure noted in Example II. Summarized in Table II hereafter are the proportions of PEI-PET by weight correlated with the property profile data of the blends.

TABLE II

| | Polyetherimide/Polyester Blends | | | | | |
|---|---|---|---|---|---|---|
| Run No. | Blend | Weight Ratio | $T_g$ (°C.) | O.I. | T.S. (psi) | E(%) |
| 1. | PEI/PET | 99/1 | 208 | 44 | 15,140 | 10 |
| 2. | PEI/PET | 95/5 | 186 | 42 | 15,220 | 11 |
| 3. | PEI/PET | 90/10 | 183 | 40 | 15,560 | 11 |
| 4. | PEI/PET | 85/15 | 164 | 39 | — | — |
| 5. | PEI/PET | 100/0 | 216 | 44–48 | 16,000 | 11–13 |

As illustrated by the above data, polyetherimide polyester blends do not substantially reduce the physical or chemical properties generally associated with polyetherimides.

Substitution of other polyetherimides, including mixtures thereof, of Formula I and other polyesters, including mixtures thereof, of Formula II for the polyetherimide and polyester, respectively, employed in Examples II or III provide analogous PEI-PE polymer property profiles.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to workloading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommended these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well-known in the art. In addition, various heat-resistant pigments and dyes may be incorporated as well as various types of inhibitors depending on the application intended.

We claim:

1. A polyetherimide-polyester blend comprising: (A) a PEI of the formula

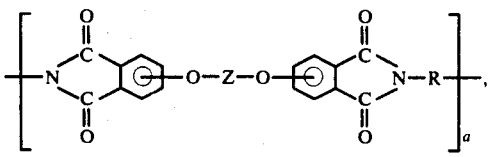

where $a$ represents a whole number in excess of 1, —O—Z—O— is in the 3 or 4-, and 3' or 4'- positions and Z is a member of the class consisting of (1)

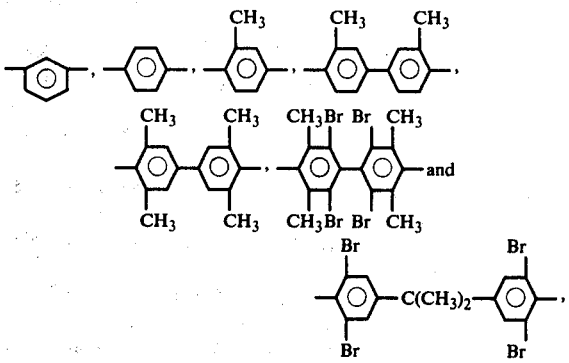

and (2) divalent organic radicals of the general formula

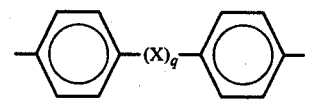

where X is a member selected from the class consisting of divalent radicals of the formulas $$-C_yH_{2y}-, -\overset{O}{\underset{\|}{C}}-, -\overset{O}{\underset{\underset{O}{\|}}{\overset{\|}{S}}}-, -O- \text{ and } -S-,$$

where q is 0 or 1, y is a whole number from 1 to 5, R is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula

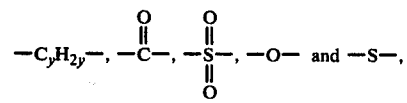

where Q is a member selected from the class consisting of $$-O-, -\overset{O}{\underset{\|}{C}}-, -\overset{O}{\underset{\underset{O}{\|}}{\overset{\|}{S}}}-, -S-, \text{ and } -C_xH_{2x}-,$$

and x is a whole number from 1 to 5 inclusive, and (B) a PE of the formula

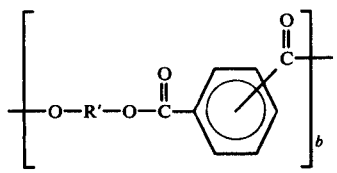

where b represents a whole number in excess of 1, R' is a divalent alkylene radical containing from 1 to 10 carbon atoms, and the two carbonyl groups are located on the aromatic ring in a para- or meta- position relative to each other.

2. The PEI-PE blend of claim 1, where the PEI component has an intrinsic viscosity of at least 0.2 dl./g. in m-cresol at 25° C. and the PE component has an intrinsic viscosity of at least 0.2 dl./g. in o-chlorophenol at 25° C.

3. The PEI-PE blend of claim 1, where the PEI:PE weight ratio range is from about 99:1 to about 1:99.

4. The PEI-PE blend of claim 1, where the PEI:PE weight ratio range is from about 99:1 to about 75:25.

5. The PEI-PE blend of claim 1, where the PEI-PE weight ratio range is from about 10:90 to about 1:99.

6. A polyetherimide-polyester blend comprising (A) a PEI of the formula

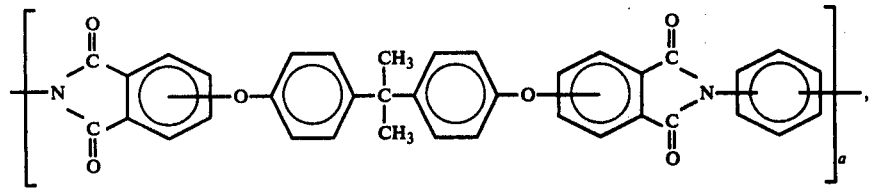

where a represents a whole number in excess of 1, and (B) a PE of the formula

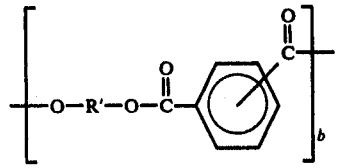

where b represents a whole number in excess of 1, R' is a divalent alkylene radical containing from 1 to 10 carbon atoms, and the two carbonyl groups are located on the aromatic ring in a para- or meta- position relative to each other.

7. The PEI-PE blend of claim 6, where the

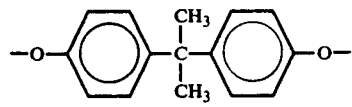

radical of the PEI is situated in the 3,3'-, 3,4'-, 4,3'- and the 4,4'- positions, the ratio of 3:3' and 4:4' positions being within the range of from about 25:75 to about 75:25.

8. The PEI-PE blend of claim 7, where the PE is a polybutylene terephthalate.

9. The PEI-PE blend of claim 7, where the PE is a polyethylene terephthalate.

10. The PEI-PE blend of claim 6, where the

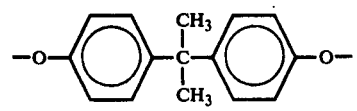

radical of the PEI is situated in the 3,3'-, 3,4'-, 4,3'- and the 4,4'- positions, the ratio of 3:3' and 4:4' positions being within the range of from about 25:75 to about 75:25 and where the PE is a polyethylene terephthalate or polybutylene terephthalate.

11. The PEI-PE blend of claim 10, where the PEI:PE weight ratio is from about 99:1 to about 75:25.

12. The PEI-PE blend of claim 10, where the PEI:PE weight ratio is from about 10:90 to about 1:99.

* * * * *